US008179888B2

(12) United States Patent
Chen et al.

(10) Patent No.: US 8,179,888 B2
(45) Date of Patent: May 15, 2012

(54) TELECOMMUNICATIONS APPARATUS AND METHOD

(75) Inventors: Xiaobao Chen, Swindon (GB); Nigel Stuart Bird, Weston-Super-Mare (GB)

(73) Assignee: Orange SA, Paris (FR)

( * ) Notice: Subject to any disclaimer, the term of this patent is extended or adjusted under 35 U.S.C. 154(b) by 861 days.

(21) Appl. No.: 11/658,827

(22) PCT Filed: Jul. 11, 2005

(86) PCT No.: PCT/GB2005/002716
§ 371 (c)(1),
(2), (4) Date: Oct. 7, 2008

(87) PCT Pub. No.: WO2006/010883
PCT Pub. Date: Feb. 2, 2006

(65) Prior Publication Data
US 2009/0052409 A1    Feb. 26, 2009

(30) Foreign Application Priority Data
Jul. 30, 2004   (GB) .................................. 0417097.3

(51) Int. Cl.
H04L 12/56   (2006.01)
(52) U.S. Cl. .............................. 370/389; 37/401; 37/466
(58) Field of Classification Search .......................... None
See application file for complete search history.

(56) References Cited

U.S. PATENT DOCUMENTS
6,708,219 B1 *  3/2004  Borella et al. ................. 709/245
(Continued)

FOREIGN PATENT DOCUMENTS
EP    1 420 559 A1    5/2004
(Continued)

OTHER PUBLICATIONS
Transition to IPv6 in GPRS and WCDMA Mobile Networks, Juha Wiljakka, Nokia. Transitioning from IPv4 to IPv6. IEEE Communications Magazine, Apr. 2002.
(Continued)

*Primary Examiner* — Kevin C Harper
*Assistant Examiner* — Rhonda Murphy
(74) *Attorney, Agent, or Firm* — Haverstock & Owens LLP

(57) ABSTRACT

A telecommunications system for communicating internet packet data in accordance with a first internet protocol (IPV6) via a packet radio network operable in accordance a second internet protocol (IPV4). The system comprises a user equipment operable to request a bearer for communicating internet protocol data according to the second internet protocol (IPV4) to and from a gateway support node of the packet radio network. The gateway support node is operable to establish a tunnelling protocol bearer for communicating the internet packet data to and from the user equipment across the packet radio network. The user equipment is operable in combination with the gateway support node to form an address which is compatible with the first internet protocol (IPv6). The address includes an interface identifier having a tunnel end-point identifier of the tunnelling protocol bearer which ends at the gateway support node of the packet radio network. The internet packet data is communicated to and from a correspondent node via the gateway support node and the established bearer using internet protocol address which is compatible with the first internet protocol (Ipv6). Systems according to the present invention are arranged to generate an address, which is compatible with a first internet protocol which can be used to communicate internet packet data via a packet radio network which has been arranged to support internet packets data according to a second internet protocol. The first internet protocol may be the IPv6 and the second internet protocol may be IPv4.

37 Claims, 9 Drawing Sheets

U.S. PATENT DOCUMENTS

| | | | | |
|---|---|---|---|---|
| 7,188,191 | B1* | 3/2007 | Hovell et al. | 709/245 |
| 7,289,504 | B1* | 10/2007 | Hippelainen et al. | 370/392 |
| 7,554,991 | B2* | 6/2009 | Sbida | 370/395.5 |
| 2001/0017856 | A1 | 8/2001 | Asokan et al. | 370/389 |
| 2001/0040895 | A1 | 11/2001 | Templin | 370/446 |
| 2003/0179742 | A1* | 9/2003 | Ogier et al. | 370/351 |
| 2004/0013130 | A1* | 1/2004 | Blanchet et al. | 370/466 |
| 2004/0264474 | A1* | 12/2004 | Sbida | 370/395.5 |
| 2007/0258399 | A1 | 11/2007 | Chen | |

FOREIGN PATENT DOCUMENTS

| | | |
|---|---|---|
| WO | WO 01/93540 A1 | 12/2001 |
| WO | WO 03/019973 A3 | 3/2003 |
| WO | WO 2004/049668 | 6/2004 |

OTHER PUBLICATIONS

Transition Mechanisms for IPv6 Hosts and Routers, FreeGate Corp., Sun Microsystems, Inc., Aug. 2000, Network Working Group, pp. 1-27, http://www.ietf.org/rfc/rfc2893.txt?number=2893.

Network Address Translation—Protocol Translation (NAT-PT), G. Tsirtsis, BT, P. Srisuresh, Campio Communications, Feb. 2000, Network Working Group, Request for Comments: 2766, Category: Standards Track, http://www.ietf.org/rfc/rfc2766.txt?number-2766.

GSM, cdmaOne and 3G Systems, Raymond Steele, Chin-Chun Lee and Peter Gould, Wiley, Mar. 2001.

3GPP TS 32.015 V3.12.0 (Dec. 2003) Technical Specification, $3^{rd}$ Generation Partnership Project; Technical Specification Group Services and System Aspects; Telecommunication Management; Charging management; Call and event data for the Packet Switched (PS) domain (Release 1999) pp. 1-65.

3GPP TS 26.202 V5.1.0 (Sep. 2002) Technical Specification, $3^{rd}$ Generation Partnership Project; Technical Specification Group Services and System Aspects; AMR wideband speech codec; Interface to Iu, Uu and Nb (Release 5) pp. 1-12.

3GPP TS 23.107 V6.1.0 (Mar. 2004) Technical Specification, $3^{rd}$ Generation Partnership Project; Technical Specification Group Services and System Aspects; Quality of Service (QoS) concept and architecture (Release 6) pp. 1-41.

Neighbor Discovery for IP Version 6 (IPv6), T. Narten, IBM, E. Nordmark,Sun Microsystems, W. Simpson, Daydreamer, Dec. 1998. Network Working Group. Request for Comments: 2461; Obsoletes: 1970, Category: Standards Track; pp.1-60 http://www.ietf.org/rfc/rfc2461.txt?number=2461.

Internet Protocol Version 6 (IPv6) Addressing Architecture, R. Hinden, Nokia, S. Deering, Cisco Systems, Apr. 2003, Network Working Group, Request for Comments: 3513; Obsoletes: 2373, Category: Standards Track, pp. 1-26 http://www.ietf.org/rfc/rfc3513.txt?number=3513.

Dynamic Host Configuration Protocol for IPv6 (DHCPv6), R. Droms, Ed., Cisco, J. Bound, Hewiett Packard, B. Volz, Ericsson, T.Lemon, Nominum, C. Perkins, Nokia Research Center, M. Carney, Sun Microsystems, Jul. 2003. http://www.ietf.org/rfc/rfc3315.txt?number=3315.

IPv6 Prefix Options for Dynamic Host Configuration Protocol (DHCP) version 6, O. Troan, R. Droms, Cisco Systems, Dec. 2003, Network Working Group, Request for Comments: 3633, Category: Standards Track,http://www.ietf.org/rfc/rfc3633.txt?number=3633.

Internet Protocol, Version 6 (IPv6), Specification, S. Deering, Cisco, R. Hinden, Nokia, Dec. 1998, Network Working Group, Request for Comments: 2460, Obsoletes: 1883, Category: Standards Track,http//.www.ietf.org/rfc/rfc2460.txt?number-2460.

\* cited by examiner

Tunnel Endpoint Identifier Data I Information Element

Tunnel Endpoint Identifier Control Plane Information Element

| ccccc0gccccccc (16bits) | ccccccc | Type (TEID) | 32 bits (TEID) |

GAT_ID_I: locally unique

| cccccc1gccccccc (16bits) | ccccccc | Type (TEID) | 32 bits (TEID) |

GAT_ID_I: globally unique

GAT_ID_II

| "0" (80 bits) | 0x00 | IPv4 Address |

| "0" (80 bits) | 0xFF | IPv4 Address |

IPv6 address with IPv4 address assigned by PDP Context Activation

| Prefix (8 octets) | GAT_ID_I (8 octets) |

GAT address for GTP automatic tunnelling

For Link - Local Address

For Site - Local Address

An IPv6 address is created using the GAT_ID_II plus the prefix

| 128 bits node address |
|---|

Fig. 17

| n bit subnet prefix | 128 - n bits interface ID |
|---|---|

Fig. 18

```
0              7 8           15 16          23
| ccccccug | ccccccc | ccccccc |
```

Fig. 19

| n bits global routing | m bits subset ID | 128-n-m bits Interface ID |
|---|---|---|

Fig. 20

| "0" (80 bits) | 0x00 | IPv4 Address |
|---|---|---|

Fig. 21

| "0" (80 bits) | 0xFF | IPv4 Address |
|---|---|---|

Fig. 22

| 10 bits | 54 bits subnet ID | 64 bits Interface ID |
|---|---|---|

Fig. 23

| 10 bits (1111111010) | 54 bits ("0") | 64 bits Interface ID |
|---|---|---|

Fig. 24

TELECOMMUNICATIONS APPARATUS AND METHOD

FIELD OF THE INVENTION

The present invention relates to system and methods for communicating internet packet data via packet radio networks, such as, for example, a network operating in accordance with the General Packet Radio Service (GPRS).

BACKGROUND OF THE INVENTION

The GPRS has been developed to communicate internet packets via a radio access interface. A GPRS network can be formed using a Global System for Mobiles (GSM) or a Universal Mobile Telecommunications System (UMTS) backbone network. GPRS provides support for packet-orientated services and attempts to optimise network and radio resources for packet data communications using for example the Internet Protocol (IP). The GPRS provides a logical architecture, which is related to the packet switched architecture of a mobile radio system.

The Internet Engineering Task Force (IETF) is a body, which is responsible for developing internet protocols for facilitating communications via the internet. For example, a well established internet protocol is the internet protocol version 4 (IPV4) which has been developed and standardised for personal computers to access the internet. The IETF has also developed a further standard known as the internet protocol version 6 (IPV6) which provides an improvement with respect to the IPV4 in terms of facilitating mobile communications and increased addressing options for user equipment. Whilst there are similarities between IPv4 and IPv6, a packet radio network which has been established to support IPv4 will expect internet packets according to the IPv4 and not IPv6.

SUMMARY OF INVENTION

According to the present invention there is provided a telecommunications system for communicating internet packet data in accordance with a first internet protocol (IPv6) via a packet radio network operable in accordance a second internet protocol (IPv4). The system comprises a user equipment operable to request a bearer for communicating internet protocol data according to the second internet protocol (IPv4) to and from a gateway support node of the packet radio network. The gateway support node is operable to establish a tunnelling protocol bearer for communicating the internet packet data to and from the user equipment across the packet radio network. The user equipment is operable in combination with the gateway support node to form an address which is compatible with the first internet protocol (IPv6) the address including an interface identifier having a tunnelling end identifier of the tunnelling protocol bearer which ends at the gateway support node of the packet radio network. The internet packet data is communicated to and from a correspondent node via the gateway support node and the established bearer using internet protocol address which is compatible with the first internet protocol (Ipv6).

Systems according to the present invention are arranged to generate an address, which is compatible with a first internet protocol which can be used to communicate internet packet data via a packet radio network which has been arranged to support internet packets data according to a second internet protocol. The address is formed with an interface identifier address component, which includes a tunnelling end identifier acquired from an allocated packet data bearer of the packet radio network. The tunnelling end identifier identifies the end of a tunnelling protocol bearer allocated by the packet radio network. The tunnelling end identifies provides a quasi-unique address within the packet radio network which having been formed into an address which is compatible with the first internet protocol can be used to communicate internet packet data via the packet radio network.

By forming the compatible address with the tunnelling end identifier, the gateway support node can be arranged, in some embodiments, to identify the bearer for communicating the internet packet data from the correspondent node to the user equipment via the packet radio network using the tunnelling end identifier. That is internet packets are routed from the correspondent node to the user equipment via the packet radio network by the gateway support node using the tunnelling end identifier to identify the allocated bearer. Tunnelling via the packet radio network is thereby substantially automatic. A Traffic Flow Template (TFT) in the gateway support node, which is usually used to route internet packet data to the user equipment using the source address may be by-passed. This is because the bearer which has been established to carry internet packet data across the packet radio network will only recognise internet packets according to the second internet protocol. However the correspondent node will be communicating internet packet data according to the first internet protocol (IPV6). Therefore, for example, the TFT will only recognise an IPV4 address. By identifying the bearer from the tunnelling end identifier the internet packets can be routed via the IPv4 bearer, by-passing the TFT.

In some embodiments the interface identifier may be formed from a combination of the tunnelling end identifier of the packet radio network and a company identifier. The company identifier is used to form an address component of the interface identifier. The company identifier identifies an operator of the packet radio network. In combination with the tunnelling identifier, the compatible address can be provided with global significance. The address can then be used to construct the first internet protocol link-local address and then used by the user equipment to request applications and services within the packet radio network. The compatible address can also be used to request a globally unique and routable address which is formed in accordance with the first internet protocol.

The compatible address may also include a field indicating whether the address is local to the packet radio network or global. If the field is provided with a value, which indicates that the address is local then the gateway support node will not allow internet packets to egress from the packet radio network. However, a value in the field, which indicates that the address is to be regarded alone, may not make the address globally unique. Accordingly, in some embodiments the compatible address may also include a prefix, which is formed in accordance with the first internet protocol. The prefix may be acquired according to the first internet protocol. This is because a UE/host can acquire an Ipv6 prefix without necessarily acquiring the full Ipv6 address. The compatible address which is an Ipv6 address, is formed with the interface ID including the company ID and the tunnel endpoint identifier. The first internet protocol prefix may be acquired from an address allocation server or by receiving the router advertisement messages according to the Neighbour Discovery for IP Version 6 (RFC2461).

In other embodiments, the prefix component of the address may be pre-assigned on a static basis. The user equipment therefore forms the compatible address from the statically assigned prefix and the interface identifier, which includes the tunnelling end identifier.

By combining the interface identifier formed from the tunnelling end identifier and the company identifier with the prefix formed in accordance with the first internet protocol, a globally unique address is provided which can be used to route internet packet data via the external packet data network. This address can be used to identify the user equipment for internet protocol applications according to the first internet protocol. The user equipment can therefore access services, which utilise the first internet protocol. In some embodiments the compatible addressed which is formed is a globally unique address. The user equipment can be accessed therefore via the external (IPv6) packet data network. In other embodiments the compatible address which is not globally unique but nevertheless locally unique can only be accessed within the Public Land Mobile Network (PLMN) by using the IPv6 link-local address.

In some embodiments, the first internet protocol may be the Internet Protocol Version 6 (IPV6) and the second internet protocol may be the Internet Protocol Version 4 (IPv4). The compatible address (that is an address compatible with the first internet protocol) can be arranged to be globally unique, by providing the interface identifier with a prefix address component according to the first internet protocol. In some embodiments the user equipment is provided with the prefix component, the compatible address being formed with a static prefix. In other embodiments the prefix component is acquired dynamically, by acquiring an IPV6 prefix component and forming the compatible address from the interface identifier and the prefix component.

Embodiments of the present invention can provide a facility for a user equipment to run application programs which require the use of internet protocol communications according to one internet protocol using a packet radio system network which has been arranged to communicate internet packets according to a different internet protocol. The packet radio network may be for example a General Packet Radio—Service (GPRS) network.

Various further aspects and features of the present invention are defined in the appending claims with supporting embodiments described below.

BRIEF DESCRIPTION OF THE DRAWINGS

Embodiments of the present invention will now be described by way of example only with reference to the accompanying drawings where like parts are provided with corresponding reference numerals and in which:

FIG. 17 is an example of a general format of an IPv6 address;

FIG. 18 is an example of an IPv6 address showing a sub-net prefix of n-bits;

FIG. 19 is an example of a modified EUI-64 format interface identifier;

FIG. 20 is an example of a global uni-cast IPv6 address;

FIG. 21 is an example of an IPv6 address having an embedded IPv4 address;

FIG. 22 is a second example of an IPv6 address having an embedded IPv4 address;

FIG. 23 is an example of a site local IPv6 address;

FIG. 24 is an example of a link local IPv6 address; and

DESCRIPTION OF THE EXAMPLE EMBODIMENTS

Embodiments described below provide mechanisms for supporting IPv6 traffic across IPv4 only GPRS/UMTS network. A 3 G operator is thereby able to support IPv6 network using an existing IPv4 only UMTS and thus risks associated with an early introduction of IPv6 IMS are minimised.

1. Example of a GPRS Network

Figure 1:
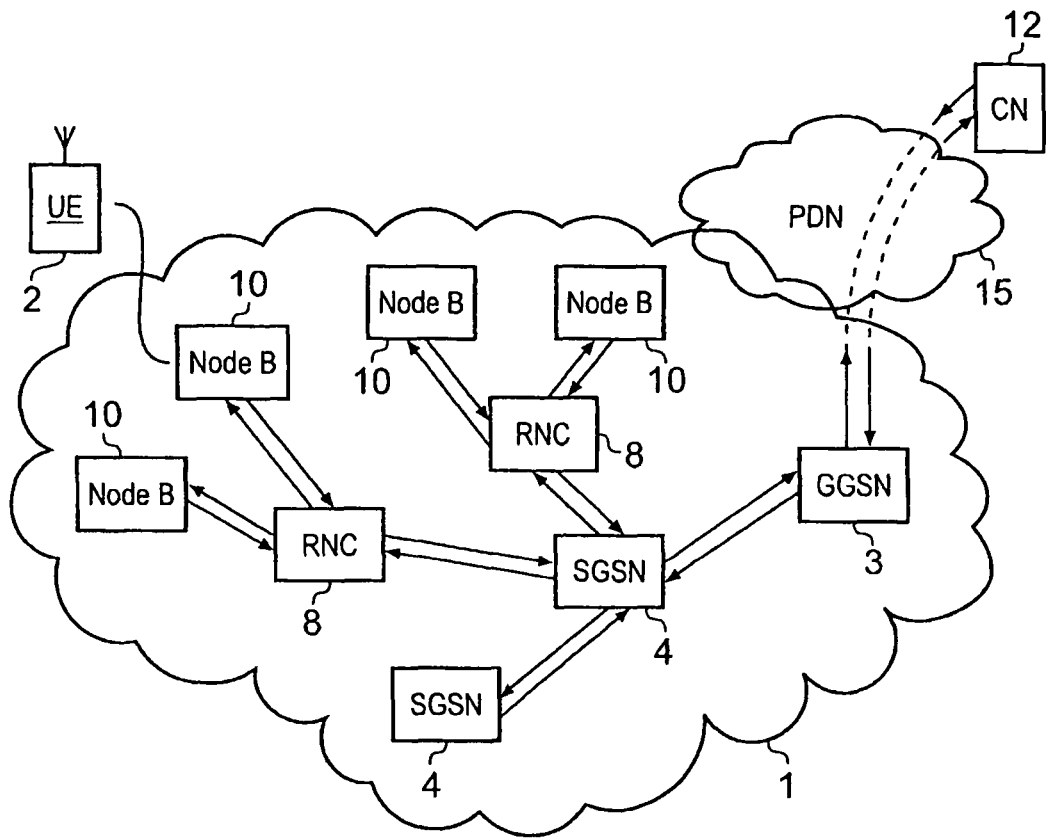
FIG. 1 is a schematic block diagram of a telecommunications system which includes a GPRS network.

FIG. 1 provides a schematic block diagram of a system for communicating internet packets according to a first (IPv6) internet protocol via a packet radio system network 1 which has been developed to support the communication of internet packets according to a second (IPv4) internet protocol standard. In FIG. 1 a user equipment (UE) 2, is arranged to host an application program providing, for example a multimedia service to a user. The application program may require, for example, access to an internet protocol multimedia subsystem (IMS) such as that developed by the 3GPP to provide multimedia services to users using a UMTS backbone network.

For the present example the packet radio system network 1 is a General Packet Radio Service (GPRS) network. For simplicity FIG. 1 shows elements of a GPRS network which are a GPRS Gateway Service Node (GGSN) 3, Serving GRPS Support Nodes (SGSN) 4, Radio Network Controllers (RNC) 8 and Node B elements 10.

The present technique concerns internet protocol communications between a correspondent node (CN) 12 and a UE 2 attached to the GPRS network 1. The CN 12 is shown in FIG. 1 as being attached to a Packet Data Network (PDN) 15, which is connected to the GPRS network. To communicate internet packet data between the CN and the UE a bearer is established across the GRPS network as illustrated in FIG. 2.

Figure 2:
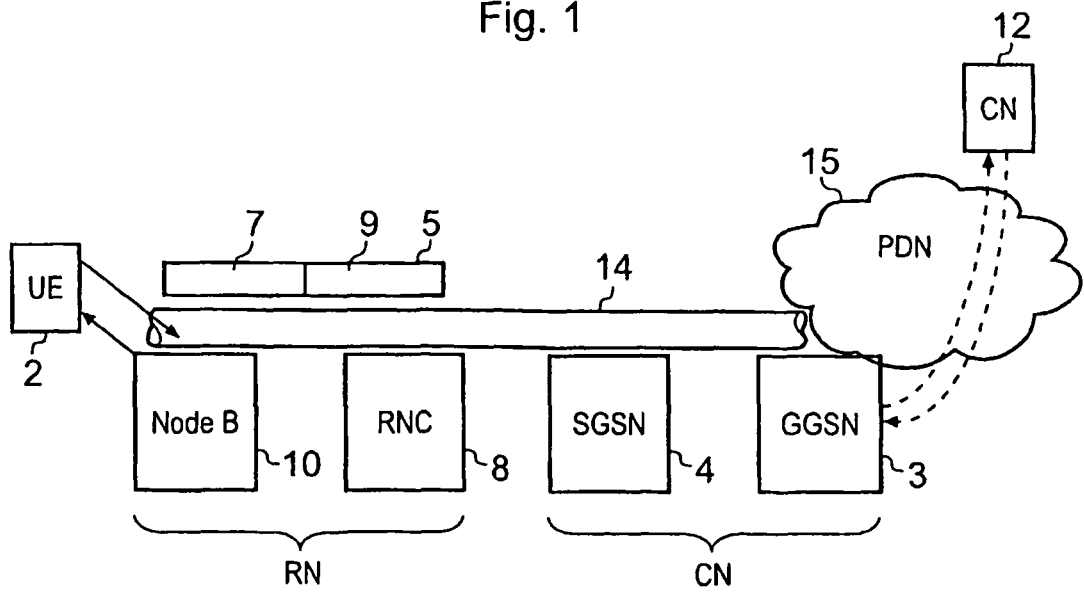
FIG. 2 is a schematic block diagram of parts of the GPRS network which form a tunnelling bear for communicating internet packets.

In FIG. 2, a bearer 14 is established between the GGSN 3 and the UE 3 for communicating internet packets 5, having a header 7 containing an address and payload data 9 to and from the UE 2 and the CN 12. Generally, the GGSN 3 and the SGSN 4 form parts of a core network. For the core network, the bearer is formed by a GPRS Tunnelling Protocol (GTP) bearer. The radio network controller RNC 8 and the Node B 10 form part of a radio network RN. For the radio network RN, the bearer is formed from a Radio Access Bearer (RAB) tunnelling protocol bearer. The bearer is arranged to communicate internet packets 16 between the US and the GGSN. The internet packets have an address 18 and a payload 20.

For the present example, the UE 2 is running an application program, which requires the support of, for example, IMS services. However, IMS has been developed and standardised in accordance with the IPv6 internet protocol standard, whereas the GPRS network 1 has been developed to support IPv4 internet protocol communications. As will be explained shortly, according to the present technique a bearer is established for the UE 2 for conveying IPv6 internet packets via the GPRS network to the CN 12. To this end the present technique is arranged to generate an internet protocol which can be used to communicate via the bearer 14, which is otherwise arranged to support IPv4 communications.

In order to provide an arrangement whereby the user equipment UE can send and receive internet packets in accordance with the IPv6 internet protocol via a GPRS network operating in accordance with the IPv4 internet protocol an address is constructed which can be automatically tunnelled across the GPRS network. Address construction is explained in the following section. More general information concerning the construction of IPv6 addresses is provided in Annex 1.

Figure 3A:
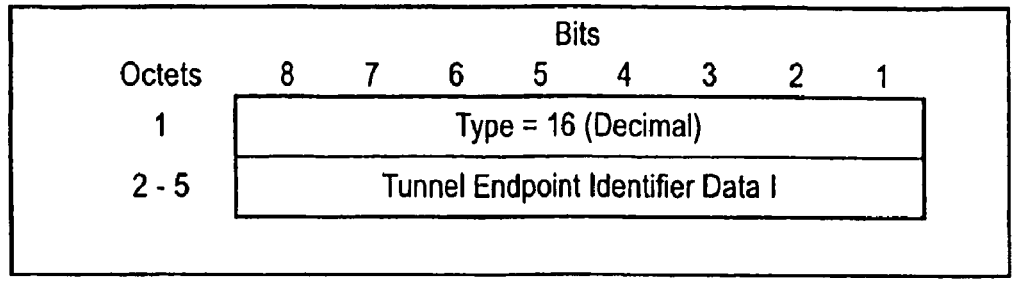
FIG. 3a is a diagram illustrating a tunnel end point identifier for data transmission.
Figure 3B:
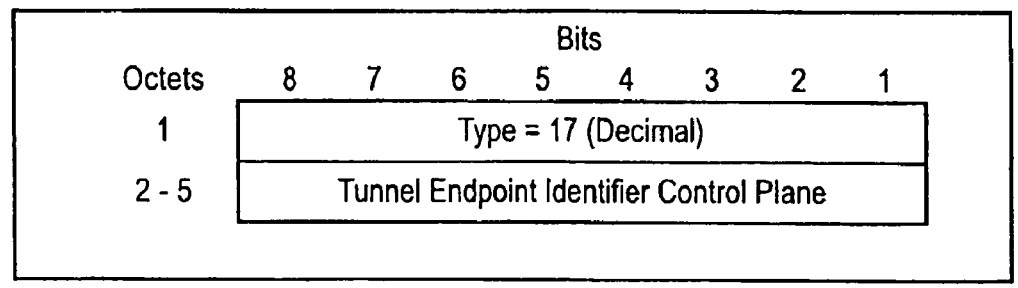
FIG. 3b is a corresponding diagram for control plane data.

2. Constructing The IPv6 Link Local Address For Automatic Tunnelling Across GPRS/UMTS The present technique utilises a tunnel end point identifier of a GPRS tunnelling protocol bearer to define an interface identifier from which an IPv6 link-local address can be formed. The interface identifier can be used to form an IPv6 compatible address which can be tunnelled automatically by the GPRS network and so is referred to as the GPRS Automatic Tunnelling (GAT) Interface ID. The GAT interface ID is defined using a GPRS Tunnelling Protocol Tunnel Endpoint Identifier which is defined as (TS29.060). The form of the TEID is shown in FIG. 3*a* for data transmission and FIG. 3*b* for control plane data.

Constructing Interface ID Using TEID—GAT ID I

Figures 4A, 4B, 5, 6, 7:
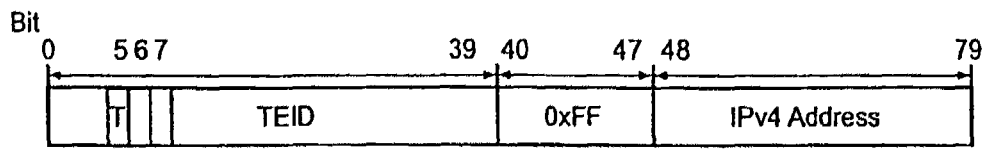
FIG. 4a schematically illustrates an address format for a first locally unique GAT ID (GAT_ID_I), and FIG. 4b schematically illustrates an address format for a first globally unique GAT ID (GAT_ID_I)
FIG. 5 schematically illustrates an address format for a second GAT ID (GAT_ID_II)
FIG. 6 schematically illustrates an address format for an IPv6 address assigned by a PDP Context Activation.
FIG. 7 schematically illustrates a general address format for GTP automatic tunnelling.

A first example of an interface identifier which can be used to form an address which is compatible with IPv6 in accordance with IPv6 Addressing Architecture (RFC2373, Appendix A) uses the TEID in combination with a company identifier. The interface identifier has 64 bits and uses a Modified IEEE EUI-64 format. The TEID is used to construct the RFC2373 compliant Interface identifier. The address is constructed as shown in FIGS. 4*a* and 4*b*, where "c" is assigned to the company_id, and "g" is a field providing the individual/group significance. There are two forms of GAT_ID_I address, one is a local unique IEEE EUI-64 address as shown in FIG. 4*a*, and the other is a globally unique IEEE EUI-64 address as shown in FIG. 4*b*.

The Definition of GAT Identifier—GAT ID II

A second example of an interface identifier which can be used to construct a IPv6 compatible address uses the IPv4 address allocated as part of a PDP context activation request. Allocations of a bearer and a IPv4 address by the GGSN is described in more detail in Annex 2. In the control plane, GTP specifies a tunnel control and management protocol (GTP-C) which allows the SGSN to provide packet data network access for a UE. Control Plane signalling is used to create, modify and delete tunnels. In the user plane, GTP uses a tunnelling mechanism (GTP-U) to provide a service for carrying user data packets.

The GPRS Automatic Tunnelling (GAT) Interface ID is defined to be the GTP Tunnel Endpoint Identifier which is defined (TS29.060) combined with the indicator of GAT Identifier (0xFF, 11111111) followed by a 32 bit, IPv4 address of the UE's. Has a local scope because the GAT ID is allocated by the GGSN which manages the sessions with the UE's, it only has local scope.

The TEID is used as a component of the GAT Interface ID (GAT-ID) in constructing the IPv6 link-local address as illustrated in FIG. 5. In FIG. 5, the first octet of the GAT ID is the GTP type. For GTP for data (GTP_U), the GTP Type is 16 (00010000). For GTP for control information (GTP_U), the GTP Type is 17 (00010001). An extra bit, T is defined in this GTP Type octet as the bit "to indicate if the IPv4 address is private or public. Bit "T" is set to 1 if the IPv4 is public and globally unique. Otherwise, it is set to zero.

Transferring TEID's to UE'

So as to construct the GAT_ID, the UE must be informed of the TEID of the GTP bearer which is established by the GGSN. In "conventional" PDP Context Activation, the TEID is used for local use within the RNC, SGSN and the GGSN. Due to the need by the UE to construct the interface ID using the TEID, the TEID needs to be passed to the UE's. In a first example the TEID is passed to the UE directly. In this case the SGSN may choose to pass one or all three pairs of TEID (6 in total) to the UE using the Protocol Configuration Option (PCO) field in PDP Context Activation Accept.

In a second example the GGSN uses one of its TEID to construct an IPv6 address according to its addressing policies and then passes it to the SGSN in the PCO field of the PDP Context Create Response Message. The SGSN in turn, pass this GGSN constructed IPv6 address to the UE using the PCO field of the PDP Context Activation Accept message.

The Formation of GAT Address

Examples of GAT addresses which may be formed in accordance with the present technique include forming the GAT address from a combination of an assigned IPv4 address and the TEID, and forming the address using a modified EUI-64 address with a GTP TEID. These examples are described in more detail as follows:

Using Embedded IPv4 Addresses

After successful PDP Context Activation, the UE is assigned IPv4 address. So this IP address can be used to construct a IPv6 address in either of the formats shown in FIG. 6. The formats shown in FIG. 6 are also called the IPv6 addresses that start with binary 0. These formats are intended to be used by the UE for the case where the PDN is IPv4 based and there needs a IPv6 over IPv4 tunnelling across the PDN before reaching an IPv6 domain.

Using Modified EUI-64 Approach with GTP TEID to Create a Unicast Addresses (GAT I)

A further example of an address is a modified EUI-64 address, which is an IPv6 unicast link-local address constructed by adding an address prefix plus the GAT interface ID. A general form of an address formed in accordance with this example technique is shown in FIG. 7. For this example, the (network) prefix takes the rest of the 8 bytes. For GAT_ID_I, the prefix takes 8 bytes. In GAT_ID_II, the network prefix takes 6 bytes because the GAT_ID_II uses 10 bytes. There are two possible formats of the general address format shown in FIG. 7, which are shown in FIGS. 8a and 8c.

Case I: Global Unicast Address is provided with a prefix, which is a global routing prefix plus the subnet ID, i.e, the n+m bits is 8 octets. The acquisition of this addressed is explained in a later section.

Case II: Site/Link-Local Unicast Address is provided with a format as shown in FIG. 8a for Link-Local Address, and FIG. 8b for a Site-Local Address. According to RFC2373, an IPv6 packets with site-local or link-local source or destination addresses must not be forwarded by routers outside of the site. These addresses are intended to be used for purposes such as automatic address configuration, neighbour discovery, or when no routers are present.

Figure 8A:
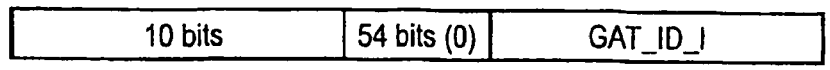
FIG. 8a schematically illustrates an address format for a link local address for GTP automatic tunnelling, and FIG. 8b schematically illustrates a corresponding address for site-local address.
Figure 8B:
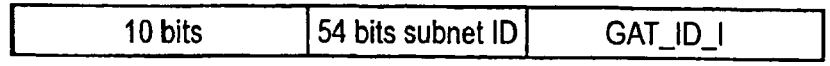

In the case of GPRS/UMTS, the two local addresses of FIGS. 8a and 8b can be used for intra-Public Land Mobile Network (PLMN) communications between UE's, i.e. the UE peers are located in the same PLMN and no packets are routed out via the Gi interface to PDN of FIG. 1.

Using GAT ID II to Construct a Global Unique IPv6 Address

Figure 9:
FIG. 9 schematically illustrates an address format for a compatible IPv6 address including an IPv6 prefix and a second GAT ID (GAT_ID_II)

A general form of an IPv6 address, which is created using the GAT_ID_II plus an IPv6 prefix is shown in FIG. 9. The advantage of using GAT_ID_II is enabling IPv6 over IPv4 automatic tunnelling where IPv6 is not available such as the case when the packets are going to a IPv4 Packet Data Network via the Gi interface. This is because the GAT_IDII enables automatic IPv6 over IPv4 tunnelling because the IPv6 address has an IPv4 address built-in.

3. The Gat Tunnelling Procedures

Completing the IPv6 Address Acquisition

Depending on the choice of the IPv6 compatible address generated, the UE may still need to take further actions to complete the construction of a global unicast address if it is necessary to do so. For example the address may be globally unique but not globally routable. For these cases the UE may use the address that are either requiring a prefix to be global routable or non-routable such as those using the local site/link addresses as described above.

To construct a global routable IPv6 address, after receiving the Create PDP Context Request, the GGSN may perform one of the following operations:

Assign a prefix (either locally or requesting from IPv6 DHCP) and then pass it the GGSN and then from SGSN to UE using the PCO filed in the PDP context messages.

Construct the site/link local addresses as shown in FIG. 8a and FIG. 8b on the UE's behalf and use it to request a prefix from an IPv6 DHCP. Then the GGSN may either send the prefix plus the GAT_ID_I or the whole globally unique IPv6 address as shown in FIGS. 4a and 4b.

Alternatively, the UE's may be statically assigned a prefix, in which case the UE always knows its prefix.

Alternatively, the UE may use the link-local address to listen to the Router Advertisement Message containing the prefix (RFC2461, Neighbour Discovery for IP Version 6).

GPRS Automatic Tunnelling of IPv6 Operations (GAT)

The GAT tunnel consists of two sections, which are the RAB Tunnel (RAB_T) and the GTP Tunnelling (GTP_T). The RAB_T is illustrated by the diagram shown in FIG. 10. The RAB_T is between the UE and the RNC and tunnelled through an RLC layer, tunnel endpoints of the RLC entities being within the UE and the RNC, respectively. Effectively, the RLC is the link layer of IPv6 packet. In this case, the IPv6 packet constructed by using the GAT address as its IPv6 address is the SDU of the RLC.

Figure 11:
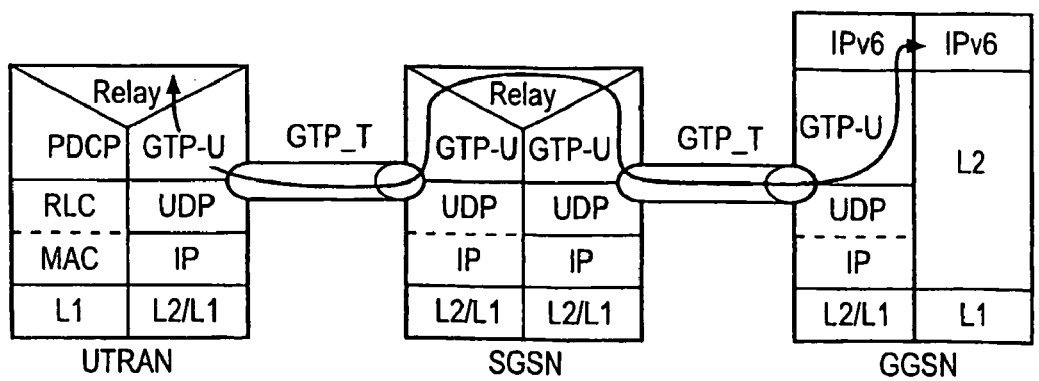
FIG. 11 is a schematic block diagram of parts of the GPRS network which serve to form a GTP tunnel.

The GTP_T is illustrated in FIG. 11. The GTP allows multi-protocol packets to be tunnelled through the UMTS/GPRS Backbone between GSNs and between SGSN and UTRAN. The GTP-U protocol is implemented by SGSN's and GGSN's in the UMTS/GPRS Backbone and by Radio Network Controllers (RCN's) in the UTRAN. SGSN's and GGSN's in the UMTS/GPRS Backbone implement the GTP-C protocol. No other systems need to be aware of the GTP. UMTS/GPRS UE's are connected to an SGSN without being aware of GTP. FIG. 11 illustrates the use of GTP_U for automatic tunnelling of IPv6 packets, which carry either use data or control/signalling information. Alternatively, GTP_T using automatic tunnelling of GTP_C is used for IPv6 packets carrying network control/signalling data and GTP_T using GTP_U is used for IPv6 packets carrying user data.

4. Summary of Operation

Figure 12:
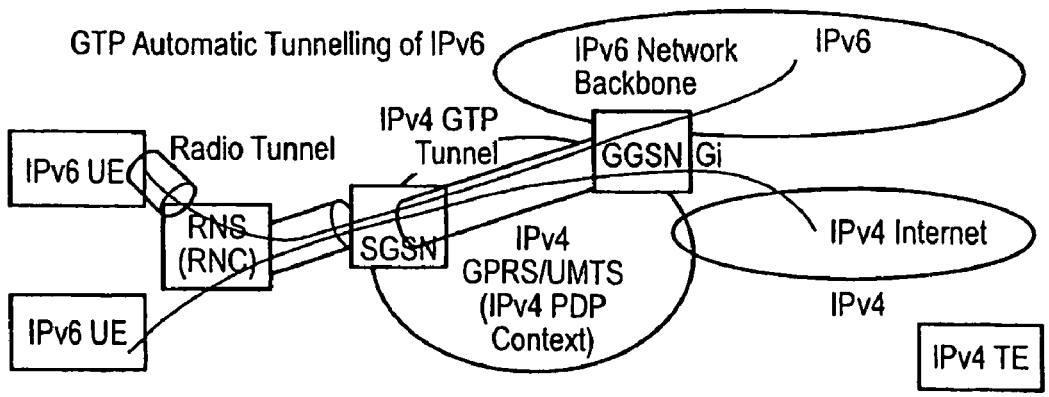
FIG. 12 is a schematic block diagram of simplified version of the telecommunications system appearing in FIG. 1, illustrating automatic tunnelling.

FIG. 12 provides an illustrations of systems which operate in accordance with the present technique. As illustrated by FIG. 12, the present technique provides an arrangement whereby the GPRS/UMTS bearer as the link layer of IPv6 can carry IPv6 packets using GPRS/UMTS frames. To this end, the UE requests an IPv4 PDP Context as described in Annex 2. The UE may either use a static IPv4 address or it may be assigned a dynamic IPv4 address as a result of successful PDP Context Activation.

Then UE constructs the GAT address according to the definition described in Section 4 and assigns it to at least one (and only one) interface of the UE's. This interface with the GAT address is used for sending internet packets.

In case UE's constructs more than one GAT address by using different GAT interface ID, then the UE can assigns GAT addresses to multiple interfaces, each assigning to only one interface. A GAT address is only assigned once to an interface but an interface can be assigned with more than one different GAT addresses.

Upon activating an IPv6 application (TCP or UDP based), a GAT address is used and the corresponding interface(s) is selected for sending and receiving the IPv6 packets via the interface(s).

Figure 13:
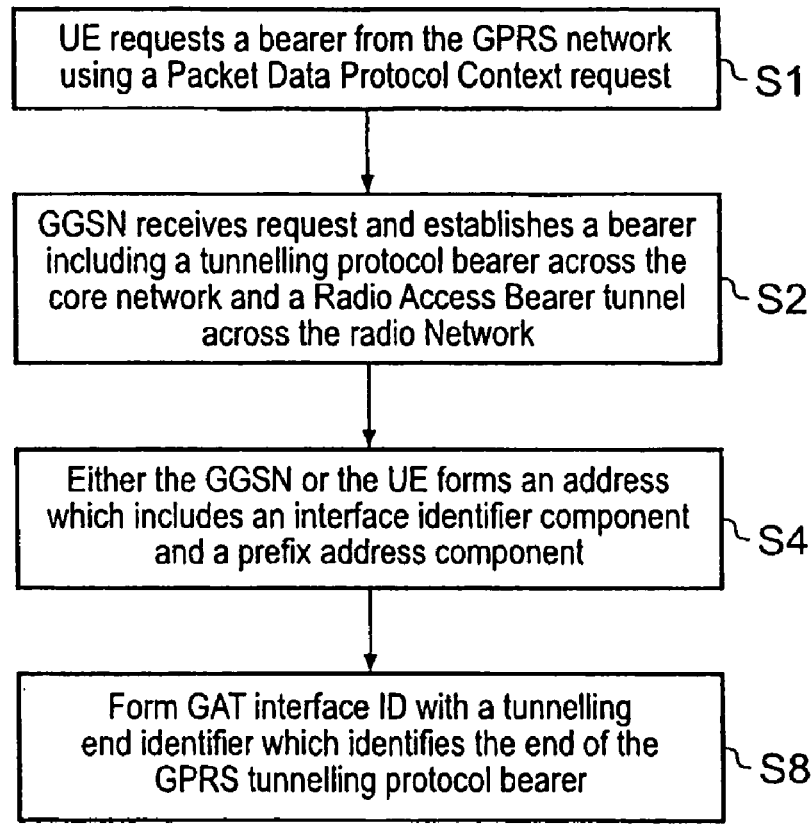
FIG. 13 is a flow diagram illustrating a process for forming a GAT address.
Figure 14:
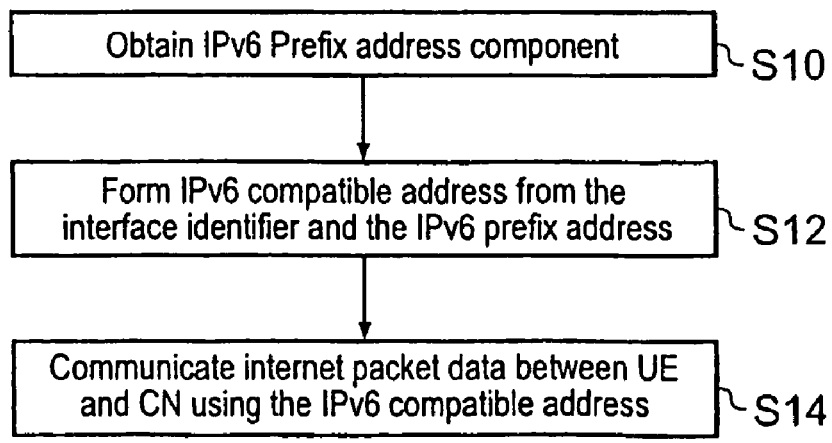
FIG. 14 is a flow diagram illustrating a process for forming a globally routable IPv6 GAT address.
Figure 15:
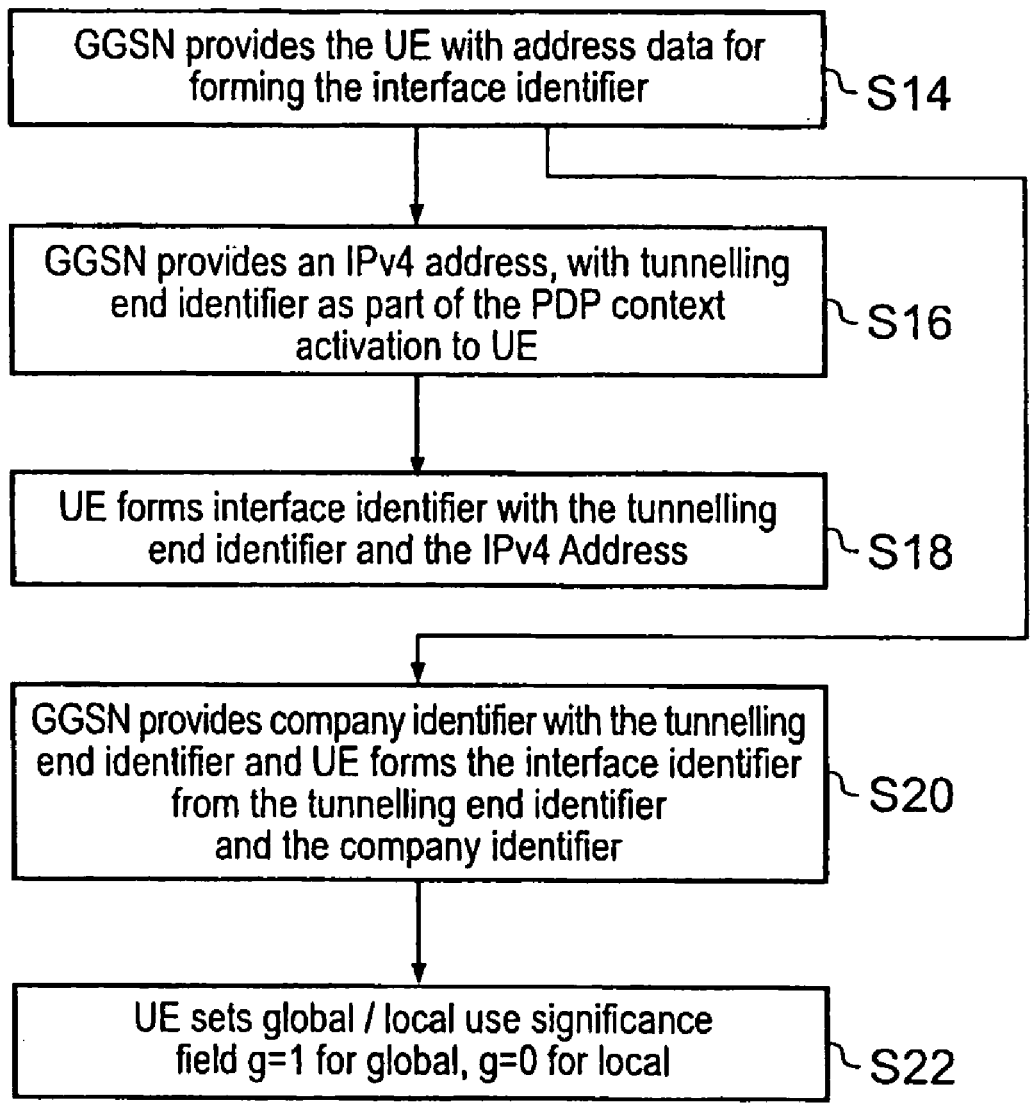
FIG. 15 is a flow diagram illustrating two options for generating different GAT address interface identifiers.

The operation of the system described above which is arranged to provide a user equipment with an IPv6 at compatible address is summarised with reference to the flow diagrams in FIGS. 13, 14 and 15. FIG. 13 provides a summary of a general procedure performing a compatible address which includes an interface identifier which can be recognised by the GPRS network whereas FIG. 14 illustrates a procedure for making the address globally routable by providing a prefix according to the IPv6 standard. The process for forming the GAT interface ID illustrated in FIG. 13 is summarised as follows:

S1: User equipment requests a bearer for communicating internet packet data across the packet radio network (GPRS network) by sending a Packet Data Protocol (PDP) context request to the GGSN. As part of the PDP context activation, the GGSN activates a bearer across the GPRS network which will of course be a bearer according to the IPv4 standard.

S2: The GGSN receives the PDP context activation request and establishes a bearer for communicating internet packet data between the UE and the GGSN. The bearer includes a tunnelling protocol bearer according to the GPRS tunnelling protocol (GTP) for tunnelling internet packets across core network components of the GPRS network. The bearer also includes a Radio Access Bearer (RAB) for tunnelling internet packet data across the radio access network from the RNC via the Node B elements to the UE.

S4: Either in the GGSN or in the UE, an address is formed which includes an interface ID component and a prefix address component.

S8: The interface ID is therefore formed from the tunnelling end identifier, which identifies the end of the GTP bearer. The address formed therefore has a local significance within the GPRS network.

Optionally in order to make the address globally significant and routable via an IPv6 router, the address needs to acquire an IPv6 prefix. This procedure is illustrated in FIG. 14. FIG. 14 is summarised as follows:

S10: The UE obtains an IPv6 address prefix component. For example the IPv6 prefix address may be statically assigned to the UE. Alternatively, the link-local address can formed with the interface ID including the tunnelling end identifier to request an IPv6 address from a DHCP server.

S12: Once the UE has acquired the IPv6 address from the DHCP server, the UE can substitute the prefix from the acquired IPv6 address providing the compatible address with an IPv6 prefix. The UE therefore forms an IPv6 compatible address from the interface ID and the IPv6 prefix address.

S14: The UE can then communicate internet packet data between the UE and the CN using the IPv6 compatible address.

Communication of the internet packet data between the UE and the CN is summarised by the flow diagram in FIG. 16 which will be explained in more detail shortly.

Figure 10:
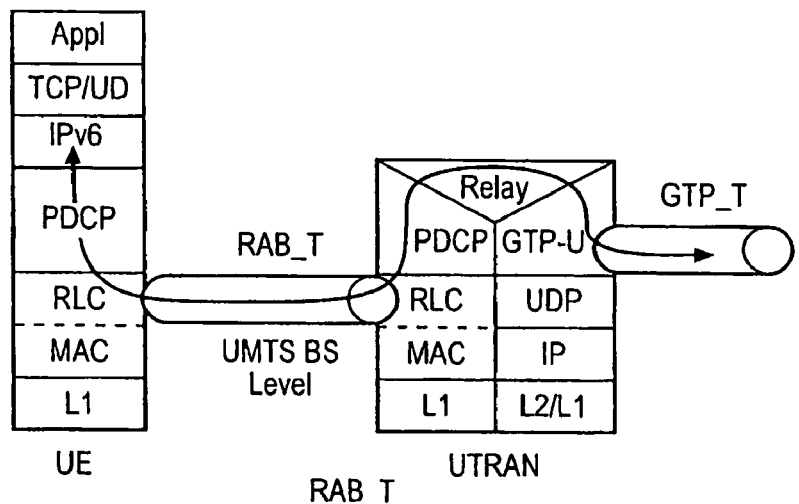
FIG. 10 is a schematic block diagram of parts of the GPRS network which serve to form a Radio Access Bearer tunnel.

As explained with reference to step S4 in FIG. 10, the present technique can utilise various options in order to establish a compatible address with the tunnelling end identifier. The address can be formed within the GGSN communicated to the UE or the address can be formed in the UE from address data communicated from the GGSN. Two options are summarised by the flow diagram shown in FIG. 15 for the case where the address is formed within the UE. FIG. 15 is summarised as follows:

S14: GGSN provides the UE with address data for example as part of the PDP context allocation, within the PCO field of the PDP Context acceptance. The address data is used to form the interface ID of the compatible address.

S16: In the first example the GGSN provides an IPv4 address allocated by the GGSN to the UE with the TEID.

S18: The UE forms the interface ID with the TEID and the IPv4 address. The address formed is therefore globally unique although in order to make this globally routable via an IPv6 network, then the IPv6 prefix address is required as illustrated with respect to FIG. 9.

S20: Alternatively the GGSN provides a company identifier with the TEID as part of the address data communicated as part of the PDP context activation. The UE then forms the interface ID from the TEID and the company identifier.

S22: As part of the compatible address, the address includes a global/local user significance field. If the address is to be used only locally within the GPRS network then the significance field is set to zero. Otherwise, if the significance field is to be used globally that is outside the GPRS network then the significance field is set to one.

Figure 16:
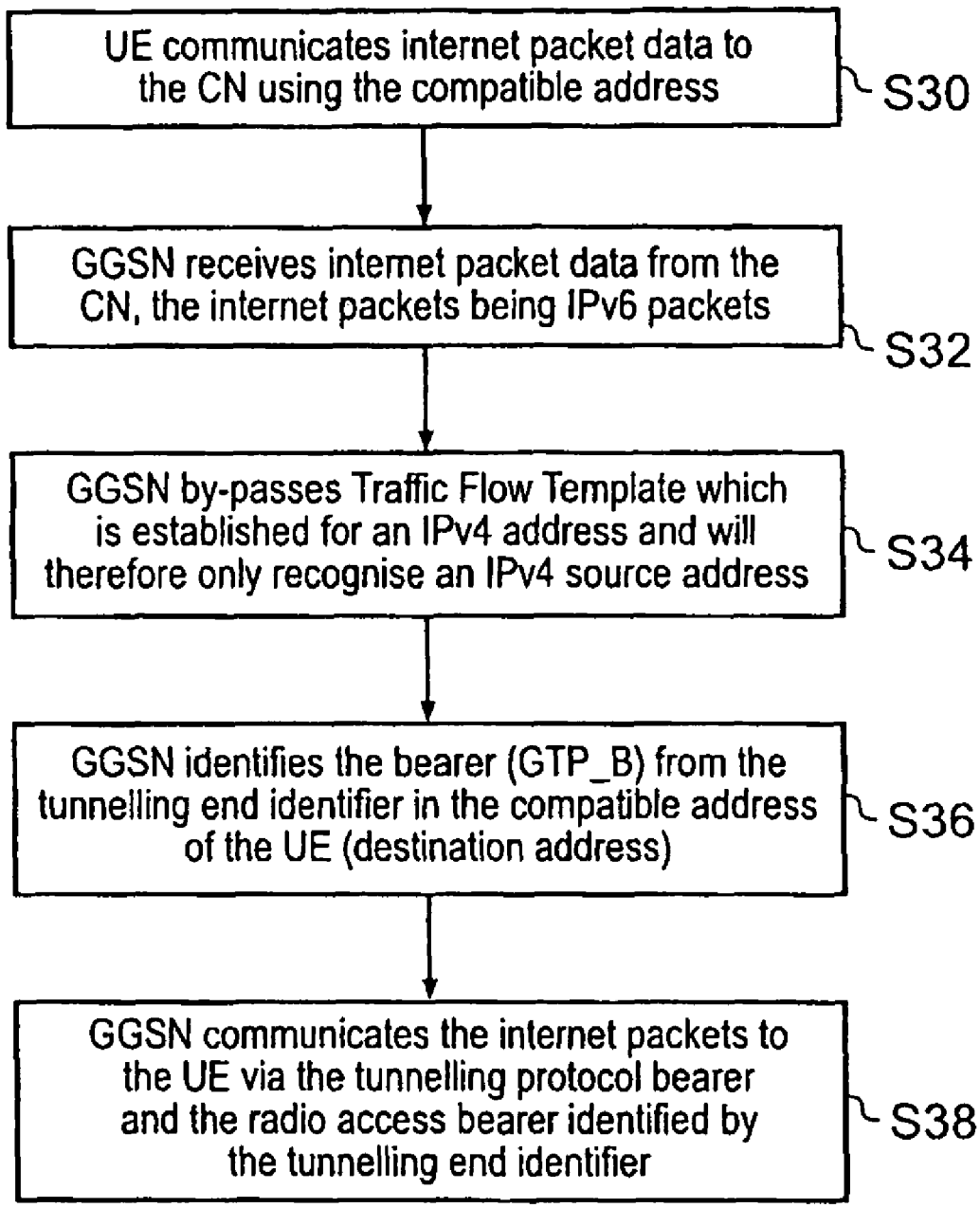
FIG. 16 is a flow diagram illustrating a process for communicating via the GPRS network using the GAT address.

FIG. 16 provides an illustration of a process of communicating internet packet data using the compatible address via the GPRS network. FIG. 16 is summarised as follows:

S30: The UE communicates internet packets to the CN using the compatible address via the radio access bearer tunnel and the GTP tunnel which does not otherwise depend on the form of the address in the internet packet header.

S32: For down-link communications the GGSN receives internet packet data from the corresponding node CN. The internet packets are IPv6 internet packets. However, since the GPRS network has been arranged to support IPv4 internet communications, the GGSN will have established an IPv4 bearer. As a result a traffic flow template (TFT) which is used to police internet communications will only recognise an IPv4 address as the source address of the correspondent node. That is to say, the bearer will have been established with reference to an IPv4 source address. As such the GGSN is modified to the effect that the TFT process is bypassed and the GGSN identifies the appropriate bearer from the tunnelling end identifier TEID.

S36: The GGSN identifies the bearer which is the GTP bearer from the TEID in the interface ID of the compatible address of the UE which is the destination address of the internet packet. Hence tunnelling is made substantially automatic S38: The GGSN will communicate to the internet packets to the UE via the GTP bearer and the RAB bearer identified by the TEID.

Various further aspects and features of the present invention are defined in the appended claims. Various modifications can be made to the embodiments herein described without departing from the scope of the present invention. For example, although the above embodiments have been described for a first internet protocol as IPv6 and the second internet protocol (communication via the packet radio system network) as IPv4, in other embodiments the first protocol may be IPv4 and the second protocol (for communication via the packet radio system network) may be IPv6. Furthermore other internet protocols may be used for the first and second internet protocols.

5. Annex 1:IPv6 Addressing Schemes

These addressing schemes are summarised in more detail in RFC 3513 "Internet Protocol Version 6 (IPv6) Addressing Architecture".

IPv6 unicast addresses are agreeable with prefixes of arbitrary bit-length similar to IPv4 addresses under Classless Routing. There are several types of unicast addresses in IPv6, in particular, global unicast, site-local unicast, and link-local unicast. There are also some special purpose subtypes of global unicast, such as IPv6 addresses with embedded IPv4 address types or encoded NSAP addresses. Additional address types or subtypes can be defined in the future.

IPv6 nodes may have considerable or little knowledge of the internal structure of the IPv6 address, depending on the role of the node plays (for instance, host versus router). At a minimum, a node may consider that unicast address (including its own) have no internal structure. An example of this is shown in FIG. 17. A slightly sophisticated host (but still rather simple) may additionally be aware of subnet prefix(s) for the link(s) it is attached to, where different addresses may have different values for the subnet prefix(s) which occupies the first n bits, as shown in FIG. 18. The address shown in FIG. 10 can be used to construct the IPv6 address, called the GAT address, for automatic tunnelling. The interface identifiers in IPv6 unicast addresses are used to identify interfaces on a link. They are required to be unique within a subnet prefix.

Constructing Interface ID of IPv6 Address

For all unicast addresses, except those that start with binary value 000 (the addresses using embedded IPv4 addresses), interface ID's are required to be 64 bits long and to be constructed in Modified EUI-64 format (IEEE, "Guidelines for 64-bit Global Identifier (EUI-64) Registration Authority" http://standards.ieee.org/regtauth/oui/tutorial/EUI64.html, March 1997).

Modified EUI-64 format based Interface identifiers may have global scope when derived from a global token (e.g. IEEE 802 48-bit MAC or IEEE EUI-64 identifiers) or may have local scope where a global token is not available (e.g. serial links, tunnel end-points, etc) or where global tokens are undesirable (e.g. temporary tokens for privacy).

Modified EUI-64 format interface identifiers are formed by inverting the "u" bit (universal/local bit in IEEE EUI-64 terminology) when forming the interface identifier from IEEE EUI-64 identifiers. In the resulting Modified EUI-64 format the "u" bit is set to "1" to indicate the global scope, and it is set to "0" to indicate local scope. The first three octets in binary of an IEEE EUI-64 identifier are shown in FIG. 19. As shown in FIG. 19, the address has fields written in Internet standard bit-order, where "u" is the universal/local bit, "g" is the individual/group bit, and "c" are the bits of the company_id. Examples are provided in RFC3513.

When there is no specific built-in interface identifier is available such as the serial links or the configured tunnels (they are called links without identifiers), interface identifiers must be chosen that are unique within a subnet-prefix.

When no built-in identifier is available on a link the preferred approach is to use a global interface identifier from another interface or one which is assigned to the node itself.

When non global interface identifier is available for use on the link, it needs to create a local-scope interface identifier.

Global IPv6 Unicast Addresses

An example of a global IPv6 uni-cast address is shown in FIG. 20.

IPv6 Addresses with Embedded IPv4 Addresses

To facilitate the IPv4 to IPv6 transition, a technique for hosts and routers to dynamically tunnel IPv6 packets over IPv4 routing infrastructure. IPv6 nodes that use this technique are assigned special IPv6 unicast address with an embedded global IPv4 address in the lower-order 32 bits. An example is shown in FIG. 21 which can be described as an "IPv4 compatible IPv6 address".

Another type of IPv4 address is called "IPv4-mapped IPv6 address" which has an address format as illustrated in FIG. 22. It can be used to represent the IPv4 nodes using IPv6 addresses.

Local-Use IPv6 Unicast Addresses

Two types of local use addresses are illustrated in FIGS. 23 and 24. These are a site-local address and a link-local address. Site local addresses are designed for addressing inside of a site without the need for a global prefix. The format of the site-local address is shown in FIG. 23.

The link-local address is designed for addressing on a single link for automatic address configuration, neighbour discovery, or when no routers are present. The format of the site-local address is shown in FIG. 24. There are other types of address such as Any-cast address, multicast address, loopback address, etc.

6. Annex 2:IPv4 UMTS Bearer Initiation Using PDP Context Activation

IP traffic (IPv6 or IPv4) is transported across the UMTS network (between UE and GGSN) across UMTS bearer. A UMTS bearer is described as the establishment of PDP (Packet Data Protocol) Context. A user equipment UE sends IPv4 or IPv6 packets across the UMTS network by setting up IPv4 PDP Context or IPv6 PDP Context. IPv6 PDP Contexts are only supported in a IPv6 capable UMTS network, specifically SGSN and GGSN as well as UE capable of supporting the IP6 related functions (routing, security) in its network protocol stack.

Figure 25:
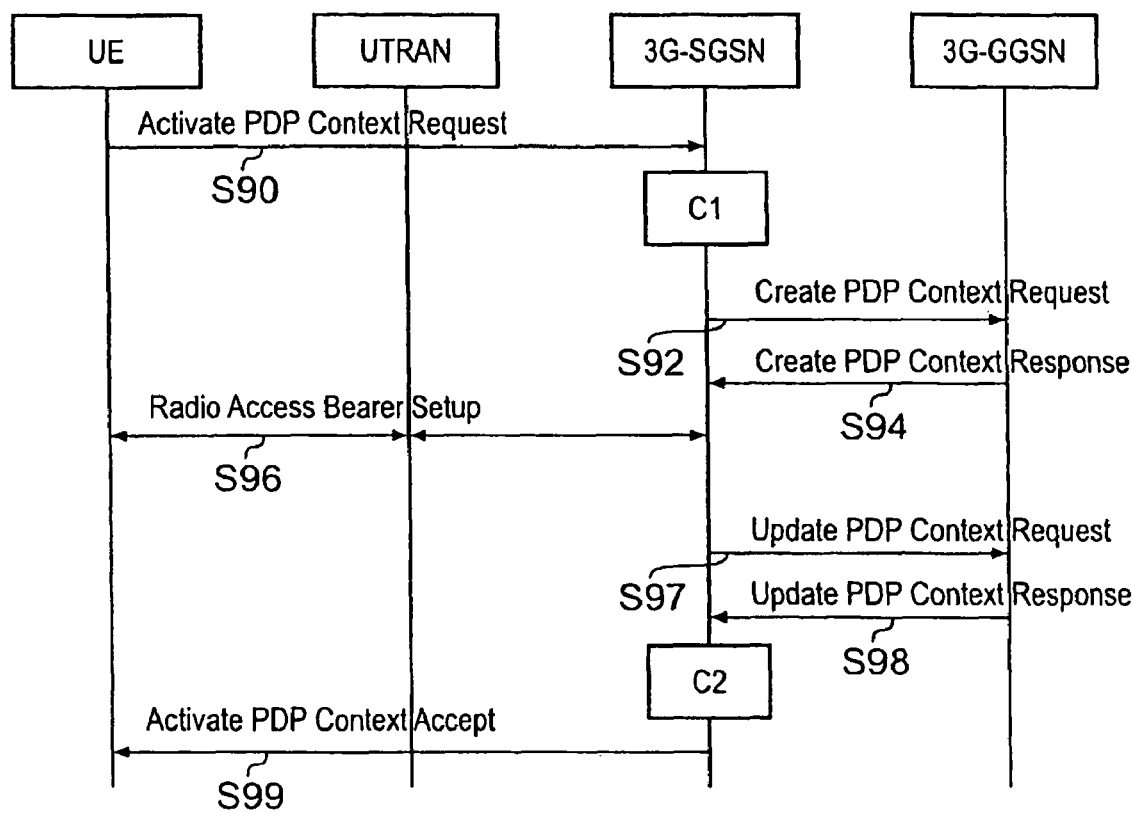
FIG. 25 is a flow diagram illustrating some of the process steps, which are required to establish a bearer for internet packets across a GPRS network.

An IPv4 only UMTS network will only support IPv4 PDP Context, although there is no explicit difference between the establishment procedures for IPv4 PDP Context and IPv6 PDP Context. Address management and security within a PDP Context activation are highlighted in the following summary with reference to a flow diagram in FIG. 25. The flow diagram of FIG. 25 represents equivalently IPv4 for IPv4 PDP Context and IPv6 for IPv6 PDP Context for an IPv6 capable UMTS.

S90: The user equipment UE sends an activate PDP Context Request (NSAPI, TI, PDP Type, PDP Address, Access Point Name, QoS Requested, PDP Configuration Options) message to the SGSN. The user equipment UE uses a PDP address to indicate whether it requires the use of a static PDP address or whether it requires the use of a dynamic PDP address. The user equipment UE leaves PDP address empty to request a dynamic PDP address.

S92: The SGSN validates the Activate PDP Context Request using PDP Type (optional), PDP Address (optional), and Access Point Name (optional) provided by the user equipment UE and the PDP context subscription records.

If no GGSN address can be derived or if the SGSN has determined that the Activate PDP Context Request is not valid according to the rules, the SGSN rejects the PDP context activation request.

If a GGSN address can be derived, the SGSN creates a TEID for the requested PDP context. If the user equipment UE requests a dynamic address, the SGSN lets a GGSN allocate the dynamic address. The SGSN may restrict the requested QoS attributes given its capabilities and the current load, and it shall restrict the requested QoS attributes according to the subscribed QoS profile.

The SGSN sends a Create PDP Context Request (PDP Type, PDP Address, Access Point Name, QoS Negotiated, TEID, NSAPI, MSISDN, Selection Mode, Charging Characteristics, Trace Reference, Trace Type, Trigger Id, OMC Identity, PDP Configuration Options) message to the affected GGSN . . . PDP Address shall be empty if a dynamic address is requested . . . .

S94: The GGSN creates a new entry in its PDP context table and generates a Charging Id. The new entry allows the GGSN to route PDP PDUs between the SGSN and the external PDP network, and to start charging. The way the GGSN handles Charging Characteristics that it may have received from the SGSN is defined in 3G TS 32.015[4]. The GGSN then returns a Create PDP Context Response (TEID, PDP Address, PDP Configuration Options, QoS Negotiated, Charging Id, and Cause) message to the SGSN. PDP Address is included if the GGSN allocated a PDP address. If the GGSN has been configured by the operator to use External PDN Address Allocation for the requested APN, PDP Address shall be set to 0.0.0.0, indicating that the PDP address shall be negotiated by the user equipment UE with the external PDN after completion of the PDP Context Activation procedure. The GGSN shall relay, modify and monitor these negotiations as long as the PDP context is in ACTIV-E state, and use the GGSN-Initiated PDP Context Modification procedure to transfer the currently used PDP address to the SGSN and the user equipment UE. PDP Configuration Options contain optional PDP parameters that the GGSN may transfer to the user equipment UE. These optional PDP parameters may be requested by the user equipment UE in the Activate PDP Context Request message, or may be sent unsolicited by the GGSN. PDP Configuration Options is sent transparently through the SGSN. The Create PDP Context messages are sent over the backbone network.

S 96: A radio access bearer is set-up in accordance with the PDP activation, including QoS negotiation. The PDP context request is then updated (S97) from the SGSN to the GGSN and the GGSN responds to the update (S98).

S 99: If the user equipment UE has requested a dynamic address, the PDP address received from the GGSN is inserted in the PDP context. The SGSN selects Radio Priority and Packet Flow Id based on QoS Negotiated, and returns an Activate PDP Context Accept (PDP Type, PDP Address, TI, QoS Negotiated, Radio Priority, Packet Flow Id, PDP Configuration Options) message to the user equipment UE. The SGSN is now able to route PDP PDUs between the GGSN and the user equipment UE, and to start charging. NSAPI (together with TD is used to distinguish secondary PDP Contexts.

7. References

[1] RFC 2893
[2] RFC2766 using SIIT (RFC 2765)
[3] R. Steele, C-C Lee and P. Gould, "GSM, cdmaOne and 3G Systems," published by Wiley International ISBN 0 471 491853
[4] 3G TS 32.015
[5] 3GPP TS 26.202 V5.1.0 (2002 September)
[6] 3GPP TS 23.107
[7] RFC2461 Neighbor Discovery for IP Version 6 (IPv6), December 1998
[8] RFC 3513 Internet Protocol Version 6 (IPv6) Addressing Architecture, April 2003
[9] RFC3315 Dynamic Host Configuration Protocol for IPv6 (DHCPv6)
[10] RFC3633 IPv6 Prefix Options for Dynamic Host Configuration Protocol (DHCP) version 6.
[11] RFC2460 Internet Protocol, Version 6 (IPv6) Specifications.

The invention claimed is:

1. A telecommunications system for communicating internet packet data in accordance with a first internet protocol via a packet radio network operable in accordance with a second internet protocol, the system comprising
a user equipment operable to request a bearer for communicating internet protocol data according to the second internet protocol to and from a gateway support node of the packet radio network,
the gateway support node being operable to establish a tunnelling protocol bearer for communicating the internet packet data to and from the user equipment across the packet radio network, wherein the user equipment is operable in combination with the gateway support node
to form an address which is compatible with the first internet protocol, the address including an interface identifier having a tunnel endpoint identifier of the tunnelling protocol bearer which ends at the gateway support node of the packet radio network, and
to communicate internet packet data to and from a correspondent node via the gateway support node and the established bearer using an internet protocol address which is compatible with the first internet protocol.

2. The telecommunication system as claimed in claim 1, wherein the gateway support node is arranged to identify the bearer for communicating the internet packet data from the correspondent node to the user equipment via the packet radio network using the tunnel endpoint identifier.

3. The telecommunications system as claimed in claim 2, wherein the interface identifier of the compatible address formed by the user equipment in combination with the gateway support node includes a company identifier indicative of an operator of the packet radio network.

4. The telecommunications system as claimed in claim 2, wherein the interface identifier of the compatible address formed by the user equipment in combination with the gateway support node includes an internet protocol address according to the second internet protocol.

5. The telecommunications system as claimed in claim 1, wherein the interface identifier of the compatible address formed by the user equipment in combination with the gateway support node includes a company identifier indicative of an operator of the packet radio network.

6. The telecommunications system as claimed in claim 5, wherein the gateway support node is operable
to communicate to the user equipment with information identifying the allocated bearer, address data, the address data including the tunnel endpoint identifier of the tunnelling protocol bearer, the user equipment being operable
to form the compatible internet protocol address using the tunnel endpoint identifier provided to the user equipment as part of the address data.

7. The telecommunications system as claimed in claim 6, wherein the address data includes one of the second internet protocol address, the company identifier, the user equipment being operable to form the address compatible with the first internet protocol from one of the second internet protocol address or the company identifier in combination with the tunnel endpoint identifier.

8. The telecommunications system as claimed in claim 7, wherein the gateway support node is operable to provide the address data as part of a packet data protocol context activation request, the address data including an internet protocol address according to the second internet protocol, and the user equipment is operable to form the address compatible with the first internet protocol from the internet protocol address according to the second internet protocol and the tunnelling end identifier.

9. The telecommunications system as claimed in claim 6, wherein the gateway support node is operable to provide the address data as part of a packet data protocol context activation request, the address data including an internet protocol address according to the second internet protocol, and the user equipment is operable to form the address compatible with the first internet protocol from the internet protocol address according to the second internet protocol and the tunnel endpoint identifier.

10. The telecommunications system as claimed in claim 9, wherein the gateway support node is operable to provide the address data including the tunnel endpoint identifier using a protocol configuration option field of the packet data protocol context acceptance.

11. The telecommunications system as claimed in claim 1, wherein the interface identifier of the compatible address formed by the user equipment in combination with the gateway support node includes an internet protocol address according to the second internet protocol.

12. The telecommunications system as claimed in claim 1, wherein the gateway support node is operable to form the internet protocol address which is compatible with the first internet protocol in the gateway support node using the tunnel endpoint identifier, and to communicate the internet protocol address to the user equipment.

13. The telecommunications system as claimed in claim 1, wherein the bearer for communicating the internet packet data includes a radio access bearer, the internet packet data being communicated in accordance with a radio access bearer tunnel, and a packet radio network tunnel protocol bearer.

14. The telecommunications system as claimed in claim 1, wherein the packet radio network operates in accordance with the General Packet Radio System.

15. The telecommunications system as claimed in claim 1, wherein the gateway support node is operable in combination with the user equipment to form the compatible address by providing a prefix corresponding to an address according to the first internet protocol with the tunnel endpoint identifier.

16. The telecommunications system as claimed in claim 15, wherein the user equipment is provided with the prefix, the compatible address being formed in the user equipment.

17. The telecommunications system as claimed in claim 15, wherein the prefix is acquired by the gateway support node, the compatible address being formed in the user equipment or the gateway support node.

18. The telecommunication system as claimed in claim 1, wherein the tunnel endpoint identifier uniquely identifies a tunnel associated with the tunnelling protocol bearer.

19. The telecommunication system as claimed in claim 1, wherein the tunnel endpoint identifier is different than the internet protocol address of the node at the endpoint of a tunnel associated with the tunnel endpoint identifier and the tunnelling protocol bearer.

20. A method of communicating internet packet data in accordance with a first internet protocol to and from a user equipment, via a packet radio network operable in accordance with a second internet protocol, the packet radio network comprising a core network part and a radio network part, the method comprising
  requesting a bearer for communicating internet protocol data according to the second internet protocol between a gateway support node of the packet radio network and the user equipment,
  forming an address which is compatible with the first internet protocol, the address including an interface identifier having a tunnel endpoint identifier of a tunnelling protocol bearer which ends at a gateway support node of the core network part of the packet radio network, and
  communicating internet packet data to and from a correspondent node via the gateway support node using the internet protocol address which is compatible with the first protocol.

21. The method of communicating internet packet data as claimed in claim 20, wherein the communicating the internet packet data to and from the correspondent node comprises
  identifying the bearer for communicating the internet packet data from the correspondent node to the user equipment via the packet radio network using the tunnel endpoint identifier.

22. The method of communicating internet packet data as claimed in claim 21, wherein the forming the internet protocol address comprises
  forming the interface identifier of the compatible internet protocol address from the tunnel endpoint identifier in combination with a company identifier indicative of an operator of the packet radio network.

23. The method of communicating internet packet data as claimed in claim 20, wherein the forming the internet protocol address comprises
  forming the interface identifier of the compatible internet protocol address from the tunnel endpoint identifier in combination with a company identifier indicative of an operator of the packet radio network.

24. The method of communicating internet packet data, as claimed in claim 23, wherein the forming the internet protocol address comprises
  communicating to the user equipment with information identifying the allocated bearer, address data, the address data including the tunnel endpoint identifier of the tunnelling protocol bearer,
  communicating the address data to the user equipment, the compatible internet protocol address being formed using the tunnel endpoint identifier in the user equipment.

25. The method as claimed in claim 24, wherein the address data includes one of the second internet protocol address, the company identifier, the address data includes an internet protocol address according to the second internet protocol, the forming the address compatible with the first internet protocol comprising
  forming the address compatible with the first internet protocol from one of the internet protocol address according to the second internet protocol or the company identifier and the tunnelling end identifier.

26. The method as claimed in claim 24, wherein the communicating to the address data comprises
  providing the address data as part of a packet data protocol context activation request.

27. The method of communicating internet packet data as claimed in claim 20, wherein the forming the internet protocol address comprises
  forming the interface identifier of the compatible internet protocol address from the tunnel endpoint identifier in combination with an internet protocol address according to the second internet protocol.

28. The method of communicating internet packet data, as claimed in claim 20, wherein the forming the internet protocol address comprises
  forming the address which is compatible with the first internet protocol in the gateway support node using the tunnel endpoint identifier, and
  communicating the internet protocol address to the user equipment.

29. The method as claimed in claim 28, wherein the communicating to the address data comprises
  providing the address data as part of a packet data protocol context activation request.

30. The method as claimed in claim 29, wherein the providing the address data as part of the packet data protocol context activation request comprises
  providing the address data including the tunnel endpoint identifier using a protocol configuration option field of the packet data protocol context acceptance.

31. The method as claimed in claim 20, wherein the packet radio network operates in accordance with the General Packet Radio System.

32. The method as claimed in claim 20, comprising
  providing a prefix corresponding to an address according to the first internet protocol, and
  forming the compatible address from the prefix and interface ID including the tunnel endpoint identifier.

33. The method as claimed in claim 20, wherein the user equipment is provided with the prefix, the compatible address being formed in the user equipment.

34. The method as claimed in claim 20, wherein the prefix is acquired by the gateway support node.

35. A non-transitory computer-readable medium storing a computer program which when loaded onto a data processor causes the data processor to perform a method according to claim 20.

36. The method of communicating internet packet data as claimed in claim 20, wherein the forming the internet protocol address comprises forming the interface identifier of the compatible internet protocol address from the tunnel endpoint identifier in combination with an internet protocol address according to the second internet protocol.

37. Apparatus for communicating internet packet data in accordance with a first internet protocol to and from a user equipment, via a packet radio network operable in accordance with a second internet protocol, the packet radio network comprising a core network part and a radio network part, the apparatus comprising means for requesting a bearer for communicating internet protocol data according to the second internet protocol between a gateway support node of the packet radio network and the user equipment, means for forming an address which is compatible with the first internet protocol, the address including an interface identifier having a tunnel endpoint identifier of a tunnelling protocol bearer which ends at a gateway support node of the core network part of the packet radio network, and means for communicating internet packet data to and from a correspondent node via the gateway support node using the internet protocol address which is compatible with the first protocol.

\* \* \* \* \*